United States Patent
Cai et al.

(10) Patent No.: US 8,088,526 B2
(45) Date of Patent: Jan. 3, 2012

(54) ANODE REACTIVE BLEED AND INJECTOR SHIFT CONTROL STRATEGY

(75) Inventors: Jun Cai, Rochester, NY (US); Akbar Chowdhury, Pittsford, NY (US); Seth E. Lerner, Honeoye Falls, NY (US); William S Marley, Rush, NY (US); David R Savage, Rochester, NY (US); James K Leary, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 606 days.

(21) Appl. No.: 12/334,040

(22) Filed: Dec. 12, 2008

(65) Prior Publication Data

US 2010/0151285 A1    Jun. 17, 2010

(51) Int. Cl.
*H01M 8/04* (2006.01)
(52) U.S. Cl. .................................. 429/431; 429/454
(58) Field of Classification Search .................. 429/431, 429/430, 454
See application file for complete search history.

(56) References Cited

U.S. PATENT DOCUMENTS

| | | | | |
|---|---|---|---|---|
| 7,858,250 B2 * | 12/2010 | Saunders et al. | ............... | 429/428 |
| 7,862,941 B2 * | 1/2011 | Gade et al. | ..................... | 429/428 |
| 7,993,787 B2 * | 8/2011 | Arthur et al. | ................... | 429/429 |
| 2009/0305099 A1 * | 12/2009 | Chowdhury et al. | ........... | 429/22 |
| 2010/0112383 A1 * | 5/2010 | Frost et al. | ........................ | 429/13 |
| 2010/0151287 A1 * | 6/2010 | Chowdhury | .................... | 429/13 |
| 2010/0190073 A1 * | 7/2010 | Lerner et al. | ................... | 429/430 |

\* cited by examiner

*Primary Examiner* — Hae Moon Hyeon
(74) *Attorney, Agent, or Firm* — John A. Miller; Miller IP Group, PLC

(57) ABSTRACT

A system and method for correcting a large fuel cell voltage spread for a split sub-stack fuel cell system. The system includes a hydrogen source that provides hydrogen to each split sub-stack and bleed valves for bleeding the anode side of the sub-stacks. The system also includes a voltage measuring device for measuring the voltage of each cell in the split sub-stacks. The system provides two levels for correcting a large stack voltage spread problem. The first level includes sending fresh hydrogen to the weak sub-stack well before a normal reactive bleed would occur, and the second level includes sending fresh hydrogen to the weak sub-stack and opening the bleed valve of the other sub-stack when the cell voltage spread is close to stack failure.

20 Claims, 3 Drawing Sheets

ANODE REACTIVE BLEED AND INJECTOR SHIFT CONTROL STRATEGY

GOVERNMENT CONTRACT

The U.S. Government may have a paid-up license in this invention and the right in limited circumstances to require the patent owner to license others on reasonable terms as provided for by the terms of Government Contract/Project awarded by the U.S. Department of Energy.

BACKGROUND OF THE INVENTION

1. Field of the Invention

This invention relates generally to a fuel cell system that corrects cell voltage instability due to hydrogen starvation and, more particularly, to a fuel cell system including split sub-stacks that injects fresh hydrogen into a weak sub-stack before a reactive anode bleed is commanded in an effort to recover from a low cell voltage and improve system stability.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be higher than the cathode side pressure, the cathode side partial pressures will cause air to permeate through the membrane. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode exhaust gas output of the fuel cell stack to remove nitrogen from the anode side of the stack.

Some fuel cell systems employ anode flow-shifting where the fuel cell stack is split into sub-stacks and the anode reactant gas is flowed through the split sub-stacks in alternating directions. In these types of designs, a bleed manifold unit (BMU) is sometimes provided between the split sub-stacks that includes the valves for providing the anode exhaust gas bleed.

An algorithm may be employed to provide an online estimation of the nitrogen concentration in the anode exhaust gas during stack operation to know when to trigger the anode exhaust gas bleed. The algorithm may track the nitrogen concentration over time in the anode side of the stack based on the permeation rate from the cathode side to the anode side, and the periodic bleeds of the anode exhaust gas. When the algorithm calculates an increase in the nitrogen concentration above a predetermined threshold, for example 10%, it may trigger the bleed. This bleed, sometimes referred to as a proactive bleed, is typically performed for a duration that allows multiple stack anode volumes to be bled, thus reducing the nitrogen concentration below the threshold.

Another type of known anode exhaust gas bleed is known as a reactive bleed. In a reactive bleed, an algorithm calculates the fuel cell voltages and triggers a bleed when a stack cell voltage spread threshold is exceeded. Cell voltage spread is the difference between the maximum and minimum cell voltages of split sub-stack. The purpose of the reactive bleed is to reduce the cell spread due to cell starvation. This is typically due to excessive nitrogen accumulation or liquid water flooding in the flow fields in the anode side of the stack.

When a reactive bleed is commanded in a split sub-stack system, the system controller typically determines which bleed valve to open based on the current shift direction of the anode flow. In one known system, a saw tooth command signal is employed to determine which of the split sub-stacks is receiving hydrogen at any particular point in time. The saw tooth command signal is based on a range of values from 0 to 1, where if the saw tooth command signal is between 0 and 0.5, then hydrogen is sent to a first sub-stack and when the saw tooth command signal is between 0.5 and 1, the flow shift is reversed, and the hydrogen is sent to the second split sub-stack. During a bleed command, the bleed valve for the sub-stack that is down-stream to the sub-stack that is receiving the fresh hydrogen is opened, where the flow shift remains in this configuration until the bleed request is terminated. When the bleed request is terminated, the command signal is reset to 0 so that the first sub-stack is always the sub-stack that receives fresh hydrogen first after a bleed request has been terminated.

Two problems can be observed by this type of command for anode flow shifting and bleed requests. First, if a cell voltage spread of either of the split sub-stacks exceeds a spread threshold and a reactive bleed is commanded, the orientation of the flow shift may be such that the weak sub-stack having the greatest cell voltage spread may not be the one that is currently receiving hydrogen, and thus, will be the one from which the bleed occurs. In other words, if one of the sub-stacks has a low performing cell and that sub-stack is the down-stream sub-stack for the current flow shift direction, then the reactive bleed that would be commanded would inject fresh hydrogen into the other sub-stack and the bleed would be provided through the bleed valve at the output of the low performing sub-stack. Thus, the more stable of the two sub-stacks is the sub-stack that is receiving the fresh hydrogen during the bleed event, which would cause the voltage spread of the weak sub-stack to increase.

Further, after the bleed request is terminated, the saw tooth command signal is reset to 0 so that the same sub-stack is always the one that is receiving the hydrogen first. This causes the sub-stack that receives hydrogen by the saw tooth command signal during 0-0.5 to receive 50% more hydrogen that the other sub-stack. This situation can be illustrated as follows. Suppose the bleed request duration is $\tau$ and the saw tooth command signal period is T. In a worst case situation, as a result of the reset of the saw tooth command signal to 0 after a bleed request is terminated, the duration for the second sub-stack to receive hydrogen is $\tau+T/2$ and the duration for the first sub-stack to receive hydrogen is $\tau+T$. Therefore, the ratio of the duration for the each sub-stack receiving fresh hydrogen is given by:

$$a_{A \text{ to } B} = \frac{\tau+T}{\tau+T/2} = \frac{\tau+T/2+T/2}{\tau+T/2} = 1 + \frac{T/2}{\tau+T/2} = 1 + \frac{1}{\frac{2\tau}{T}+1} \quad (1)$$

For low current density, the bleed request duration $\tau$ is usually small compared to the saw tooth command signal period T, and therefore, $R_{AtoB}$ is large. For example, for a stack current density j=0.1, the saw tooth command signal shift period T=6.09 seconds and the bleed period $\tau$=3 s. Therefore:

$$R_{A \text{ to } B} = 1 + \frac{1}{\frac{2\tau}{T}+1} = 1 + \frac{1}{\frac{2\times 3}{6.09}+1} \approx 1.5 \quad (2)$$

This means that the first sub-stack tends to receive hydrogen 50% more often than the second sub-stack for the same bleed request condition. This calculation also explains that stack voltage drop occurs more often in low current density conditions and the second sub-stack tends to be the weak stack more often.

SUMMARY OF THE INVENTION

In accordance with the teachings of the present invention, a system and method are disclosed for correcting a large fuel cell voltage spread for a split sub-stack fuel cell system. The system includes a hydrogen source that provides hydrogen to each split sub-stack and bleed valves for bleeding the anode side of the sub-stacks. The system also includes a voltage measuring device for measuring the voltage of each cell in the split sub-stacks. The system provides two levels for correcting a large stack voltage spread problem. The first level includes sending fresh hydrogen to the weak sub-stack well before a normal reactive bleed would occur, and the second level includes sending fresh hydrogen to the weak sub-stack and opening the bleed valve of the other sub-stack when the cell voltage spread is close to stack failure.

According to another embodiment, after a bleed request is terminated, a saw tooth command signal that determines the flow shift direction for the system is reset so that the sub-stack that was not receiving the fresh hydrogen when the bleed request was initiated is the first one to receive the fresh hydrogen after the bleed request is terminated.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for correcting a large stack cell voltage spread for a split sub-stack and a fuel cell system is merely exemplary in nature, and is in no way intended to limit the invention or its applications or uses.

Figure 1:
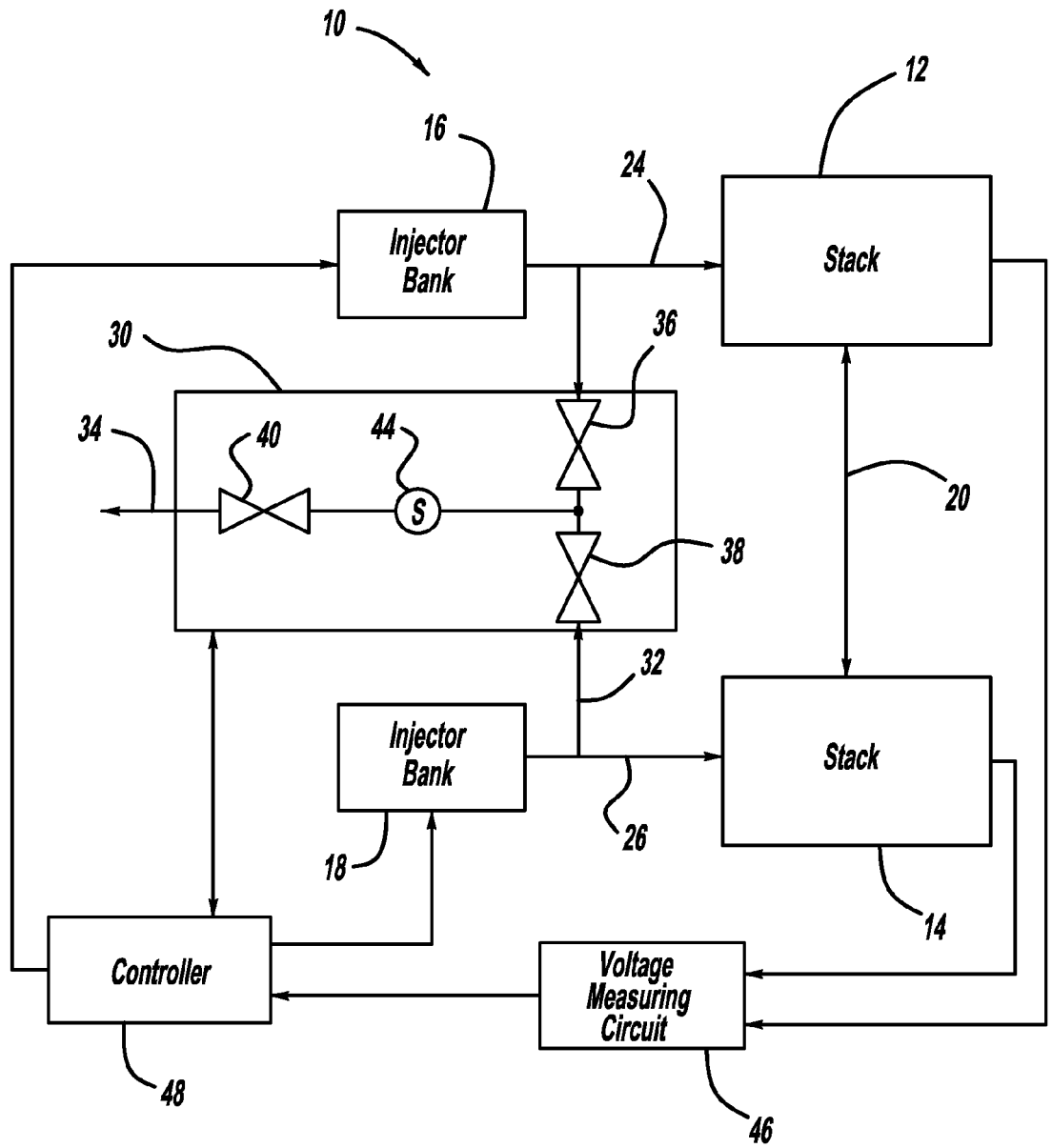
FIG. 1 is a schematic block diagram of a split sub-stack fuel cell system.

FIG. 1 is a schematic block diagram of a fuel cell system 10 including split fuel cell sub-stacks 12 and 14 that operate under anode flow-shifting. When the flow is in one direction, an injector bank 16 injects fresh hydrogen into the anode side of the sub-stack 12 on anode input line 24. Anode gas that is output from the sub-stack 12 is sent to the sub-stack 14 on connecting line 20. When the flow is in the opposite direction, an injector bank 18 injects fresh hydrogen into the anode side of the sub-stack 14 on anode input line 26 that is output from the sub-stack 14 and sent to the sub-stack 12 on the line 20.

A BMU 30 is provided at an anode input to the split sub-stacks 12 and 14 and provides an anode exhaust gas bleed during certain times to remove nitrogen from the anode side of sub-stacks 12 and 14 based on any suitable bleed schedule. The BMU 30 includes a line 32 that connects the anode input lines 24 and 26 and an exhaust line 34 that connects the line 32 to the exhaust of the system 10, typically the cathode side exhaust of the sub-stacks 12 and 14. A first bleed valve 36 is provided in the line 32 proximate to the sub-stack 12 and a second bleed valve 38 is provided in the line 32 proximate the sub-stack 14. An exhaust valve 40 is provided in the line 34 that is opened during the anode bleed and other times as may be required.

The system 10 also includes a cell voltage monitor (CVM) 46 that measures the voltage of each cell in the sub-stacks 12 and 14 of the split stack fuel cell system. A controller 48 controls the injector banks 16 and 18 and the valves 36, 38 and 40. The controller 48 receives the voltage measurement signals from the CVM 46 and determines the minimum cell voltage, the maximum cell voltage and the voltage spread for each of the sub-stacks 12 and 14.

When the system 10 is operating under anode flow-shifting and no bleed is commanded, the bleed valves 36 and 38 are both closed, so that depending on the direction of the anode gas flow, the output of the second sub-stack is dead-ended. If a bleed is commanded, and the flow is in the direction from the sub-stack 12 to the sub-stack 14 through the line 20, then the bleed valve 38 is opened and the bleed valve 36 is closed. Likewise, if a bleed is commanded and the flow is in the direction from the sub-stack 14 to the sub-stack 12 through the line 20, then the first bleed valve 36 is opened and the second bleed valve 38 is closed. Thus, the anode exhaust gas is bled out of the exhaust line 34 through the exhaust valve 40.

Figure 2:
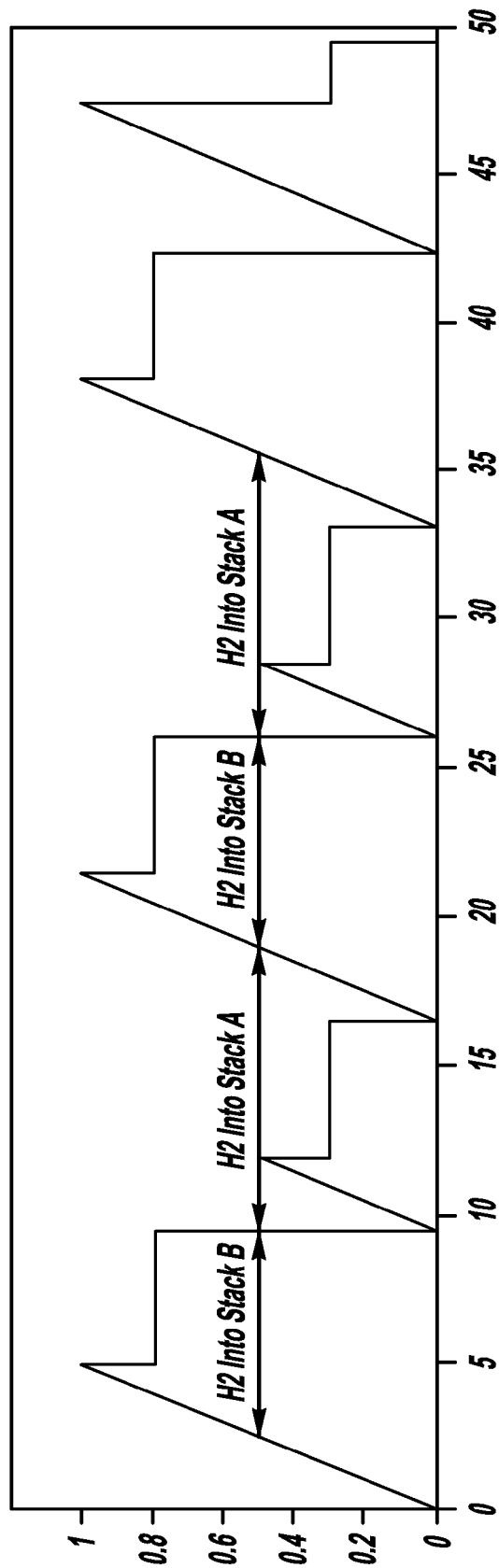
FIG. 2 is a graph with time on the horizontal axis and magnitude on the vertical axis showing a saw tooth command signal for determining the anode flow-shifting sequence for the split sub-stacks of a split stack fuel cell system.

FIG. 2 is a graph with time on the horizontal axis and magnitude on the vertical axis showing a saw tooth command signal for determining the anode flow-shifting timing sequence as discussed above. The slope of the line represents the frequency of the flow shifting and whether the value of the command line is between 0 and 0.5 and 0.5 and 1 determines which of the sub-stacks 12 or 14 is currently receiving fresh hydrogen. Particularly, if the command line is between 0 and 0.5 one of the sub-stacks will be receiving fresh hydrogen and when the command is between 0.5 and 1 the flow shift reverses were the other sub-stack receives the fresh hydrogen. The plateaus in the command line represent times when a bleed is occurring, where the flow shifting is suspended and the sub-stack 12 or 14 that is currently receiving hydrogen determines that the other of the sub-stack 12 or 14 will be bled. When the bleed request is terminated where the plateau ends, it is apparent that the flow-shifting command signal is reset to 0 so that the same sub-stack 12 or 14 is the first one to receive fresh hydrogen after a bleed request is terminated.

According to one embodiment of the invention, instead of resetting the saw tooth command signal to 0 each time a bleed request has terminated, the saw tooth command signal is set to the opposite of which stack received hydrogen last. Therefore, if a bleed request is commanded when the sub-stack 12 is receiving hydrogen, where the bleed is from the sub-stack 14, then the saw tooth command signal will be reset to 0 or 0.5 (corresponding to sub-stack 14) so that the sub-stack 14 receives hydrogen first when the bleed request is terminated. Likewise, if the sub-stack 14 is receiving hydrogen when a bleed is requested, the saw tooth command signal will be reset to 0 or 0.5 (corresponding to sub-stack 12) after the bleed request is terminated so that the sub-stack 12 is the first to receive hydrogen when the bleed request is terminated.

When a split sub-stack system experiences a low cell voltage it is advantageous to determine which sub-stack is underperforming to adequately react to the problem. The present invention recognizes that an injection of fresh hydrogen into the sub-stack with the low performing cell prior to an anode bleed improves cell voltage recovery outcomes. Therefore, an algorithm is provided to determine whether the cell voltage of each sub-stack is within desirable minimum cell voltage levels and the stack voltage spread is within an acceptable range, and if not, taking suitable remedial action.

Figure 3:
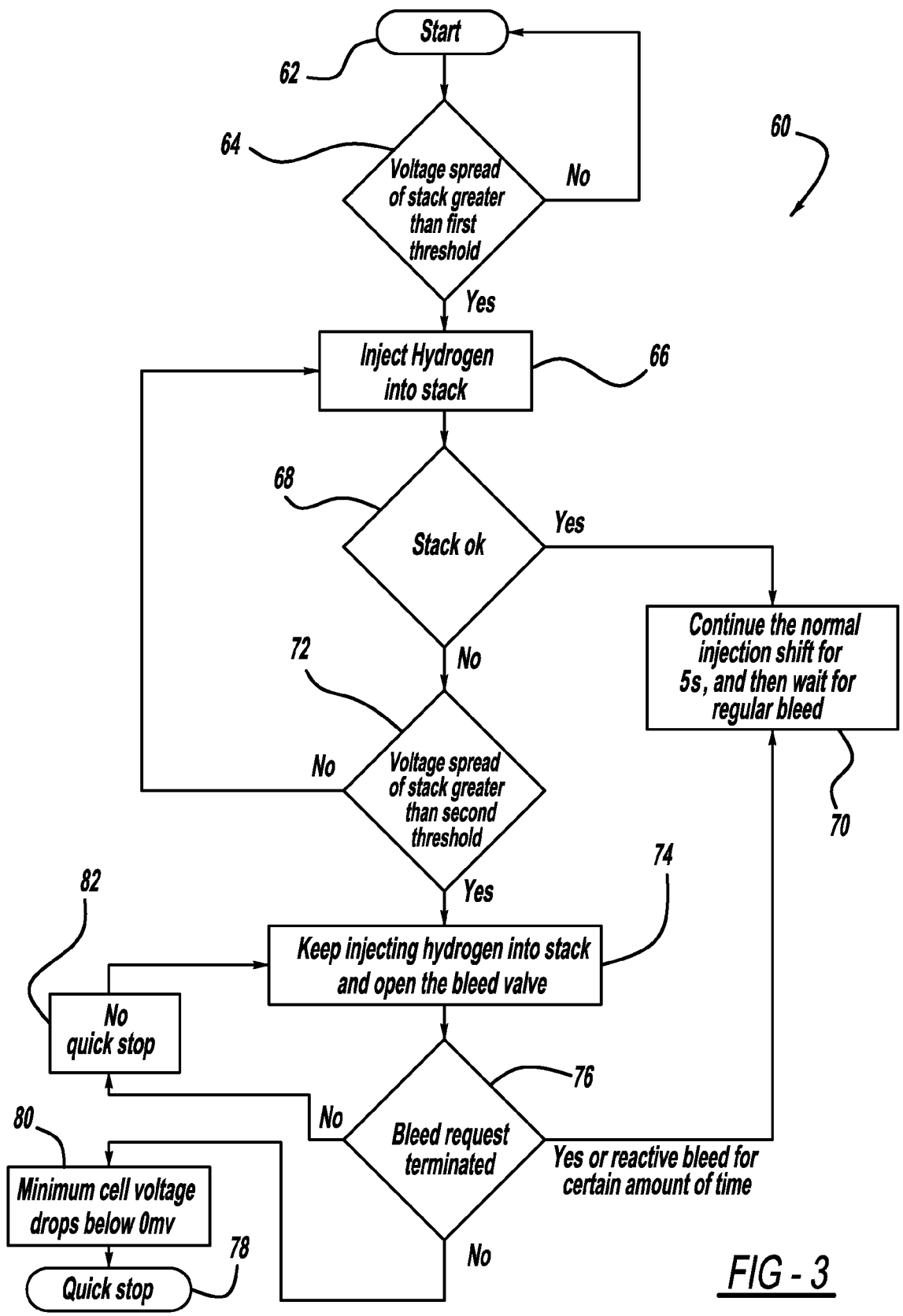
FIG. 3 is a flow diagram showing a process for correcting a low stack cell voltage spread.

FIG. 3 is a flow diagram 60 showing a process for correcting a large cell voltage spread. The flow chart diagram 60 is for one of the split sub-stacks 12 and 14 with the understanding that the same operation is performed for the other sub-stack 12 or 14, either simultaneously or in an alternating manner. Periodically, the system 10 initiates the procedure for monitoring the split sub-stack voltage spread at box 62. At box 64, the controller 48 determines if the voltage spread of the sub-stack 12 or 14 is greater than a first spread threshold. In one non-limiting embodiment, the first threshold is 150 mV as being a suitable voltage significantly below the value where a stack quick stop needs to occur, but provides an indication that one of the cells in the sub-stack 12 or 14 may be failing. If the cell voltage spread is not greater than the first threshold, then the algorithm returns to the start box 62.

If the cell voltage spread of the sub-stack 12 or 14 is greater than the first threshold at the decision diamond 64, meaning that the voltage of at least one of the cells in the sub-stack 12 or 14 is beginning to fall, the algorithm injects hydrogen into that sub-stack 12 or 14 at box 66. After some predetermined period of time, for example 5 seconds, the algorithm will then determine whether injecting fresh hydrogen into the sub-stack 12 or 14 is correcting the high voltage spread problem at decision diamond 68, and if so, the algorithm proceeds to box 70 to wait for the next anode exhaust gas bleed.

If injecting hydrogen into the sub-stack 12 or 14 does not cause the cell voltage spread to fall below the first threshold at the decision diamond 68, then the algorithm determines whether the cell voltage spread of the sub-stack 12 or 14 is greater than a second spread threshold at decision diamond 72. The second threshold is a voltage spread where the sub-stack has a more serious problem where it may be near to stack failure, which may require a quick stop. In one non-limiting embodiment, the second voltage spread threshold is about 250 mV. If the cell voltage spread of the sub-stack 12 or 14 has not reached the second threshold at the decision diamond 72, then the algorithm returns to the box 66 to continue injecting fresh hydrogen into the sub-stack 12 or 14 with the hope that this process will eventually correct the problem and the cell voltage spread will fall below the first threshold. In addition, due care must be taken to ensure that the stronger of the two sub-stacks does not become unstable while attending to the weak sub-stack by continuously flowing fresh hydrogen into the weak sub-stack for an un-restricted time period. Thus, it is imperative to force a switch at a predetermined periodic rate to briefly feed fresh hydrogen into the strong sub-stack to proactively prevent the stronger sub-stack from becoming hydrogen starved.

If the cell voltage spread of the sub-stack 12 or 14 is greater than the second threshold at the decision diamond 72, meaning that injecting the fresh hydrogen into the sub-stack is not correcting the problem causing the low cell voltage, then the algorithm continues injecting fresh hydrogen into the sub-stack 12 or 14 and opens the bleed valve of the other sub-stack 12 or 14 at box 74 in a continued effort to correct the cell voltage spread problem. The algorithm then determines whether the bleed request has been terminated at decision diamond 76, which may occur because the cell voltage spread has fallen below the first threshold, meaning that injecting the fresh hydrogen and opening the bleed valve has solved the cell voltage spread problem. If the bleed request has terminated at the decision diamond 76, the algorithm returns to the box 70 to wait for the next regular anode bleed. If, however, the fresh hydrogen and the bleed do not correct the cell voltage spread problem, the algorithm will return to the box 74 in an attempt to continue to remediate the weak sub-stack at box 82. If after a predetermined period of time the condition of the sub-stack has not improved, a forced switch to feed the stronger sub-stack will occur for a brief time period before returning to the box 74. This system will remain in a repeating control loop until either the weak sub-stack recovers or until the minimum cell voltage continues to drop below an absolute minimum voltage threshold around 0 mV at box 80, resulting in a decision to provide a quick stop at box 78.

Thus, the process discussed above provides two levels for correcting a large cell voltage spread problem. The first level to correct the problem includes injecting fresh hydrogen into a failing sub-stack well before a normal reactive bleed would occur, and the second level includes injecting fresh hydrogen into the failing sub-stack and opening the bleed valve of the other sub-stack when the cell voltage spread is close to stack failure.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system configured to operate under anode flow shifting, said system comprising:
    a first split sub-stack;
    a second split sub-stack;
    first and second hydrogen sources providing fresh hydrogen to the first and second sub-stacks;
    a first anode bleed valve positioned proximate to an anode input of the first split sub-stack and a second anode bleed valve positioned proximate to an anode input of the second split sub-stack;
    a voltage measuring circuit for measuring the voltage of fuel cells in the first and second split sub-stacks; and
    a controller responsive to voltage signals from the voltage measuring circuit, said controller determining a fuel cell voltage spread for both the first and second sub-stacks, said controller suspending the anode flow shifting and causing fresh hydrogen to only be sent to the first or second sub-stack if the cell voltage spread of the first or second sub-stack is greater than a first predetermined threshold and causing fresh hydrogen to be sent to the first or second sub-stack and an anode bleed from the other of the first or second sub-stack if the cell voltage spread is greater than a second predetermined threshold that is larger than the first predetermined threshold.

2. The system according to claim 1 wherein the controller waits for a period of time of about 5 seconds after the first or second sub-stack cell voltage spread is greater than the first threshold to determine whether the cell voltage spread of the first or second sub-stack has fallen below the first threshold or is greater than the second threshold.

3. The system according to claim 1 wherein the controller continues sending fresh hydrogen to the first or second sub-stack if the cell voltage spread of the first or second sub-stack is between the first and second thresholds.

4. The system according to claim 1 wherein the first threshold is about 150 mV.

5. The system according to claim 1 wherein the second threshold is about 250 mV.

6. The system according to claim 1 wherein the controller causes a system quick stop if the cell voltage spread of the first or second sub-stack stays greater than a third ultimate minimum threshold for a certain period of time after the controller causes fresh hydrogen to be sent to the first or second sub-stack and an anode bleed from the other of the first or second sub-stack.

7. The system according to claim 1 wherein the controller sets an anode flow shifting frequency for the first and second sub-stacks using a saw tooth command signal where a value of 0 to 0.5 of the signal magnitude causes fresh hydrogen to be sent to the first sub-stack and a value of 0.5 to 1 of the signal magnitude causes fresh hydrogen to be sent to the second sub-stack, and wherein the controller resets the saw tooth command signal to 0 or 0.5 after an anode bleed is terminated so that the other of the first or second sub-stack receives fresh hydrogen first that was not receiving the fresh hydrogen when the anode bleed was initiated.

8. A fuel cell system comprising:
    a first split sub-stack;
    a second split sub-stack;
    first and second hydrogen sources providing fresh hydrogen to the first and second sub-stacks;
    a first anode bleed valve positioned proximate to an anode input of the first split sub-stack and a second anode bleed valve positioned proximate to an anode input of the second split sub-stack;
    a voltage measuring circuit for measuring the voltage of fuel cells in the first and second split sub-stacks; and
    a controller for controlling the hydrogen sources and the first and second anode bleed valves, said controller setting an anode flow shift frequency for the first and second sub-stacks using a saw tooth command signal where a value of 0 to 0.5 of the signal magnitude causes fresh hydrogen to be sent to the first sub-stack and a value of 0.5 to 1 of the signal magnitude causes fresh hydrogen to be sent to the second sub-stack, said controller resetting the saw tooth command signal to 0 or 0.5 after an anode bleed is terminated so that the other of the first or second sub-stack receives fresh hydrogen first that was not receiving the fresh hydrogen when the anode bleed was initiated.

9. The system according to claim 8 wherein the controller receives voltage signals from the voltage measuring circuit and determines a fuel cell voltage spread for both the first and second sub-stacks, said controlling causing fresh hydrogen to be sent to the first or second sub-stack if the cell voltage spread of the first or second sub-stack is greater than a first predetermined threshold.

10. The system according to claim 9 wherein the first threshold is about 150 mV.

11. The system according to claim 9 wherein the controller causes fresh hydrogen to be sent to the first or second sub-stack and an anode bleed from the other of the first or second sub-stack if the cell voltage spread is greater than a second predetermined threshold that is larger than the first predetermined threshold, and wherein the second threshold is about 250 mV.

12. The system according to claim 11 wherein the controller waits for a period of time of about 5 seconds after the first or second sub-stack cell voltage spread is greater than the first threshold to determine whether the cell voltage spread of the first or second sub-stack has fallen below the first threshold or is greater than the second threshold.

13. The system according to claim 11 wherein the controller continues sending fresh hydrogen to the first or second sub-stack if the cell voltage spread of the first or second sub-stack is between the first and second thresholds.

14. A method for correcting a large fuel cell voltage spread in a first or second split sub-stack of a fuel cell system that operates under anode flow shifting, said method comprising:
    determining a voltage spread of the voltages of fuel cells in the first and second sub-stacks;
    suspending the anode flow shifting and only sending fresh hydrogen to the first or second sub-stack if the cell voltage spread of the first or second sub-stack is greater than a first predetermined threshold; and
    sending fresh hydrogen to the first or second sub-stack and bleeding an anode of the other of the first or second sub-stack if the cell voltage spread is greater than a second predetermined threshold that is larger than the first predetermined threshold.

15. The method according to claim 14 further comprising setting an anode flow shift frequency for the first and second sub-stack using a saw tooth command signal where a value of 0 to 0.5 of the signal magnitude causes fresh hydrogen to be sent to the first sub-stack and a value of 0.5 to 1 of the signal magnitude causes fresh hydrogen to be sent to the second sub-stack, and further comprising resetting the saw tooth command signal to 0 or 0.5 after an anode bleed is terminated so that the other of the first or second sub-stack receives fresh hydrogen first that was not receiving the fresh hydrogen when the anode bleed was initiated.

16. The method according to claim 14 further comprising waiting for a period of about 5 seconds after the first or second sub-stack cell voltage spread is greater than the first threshold to determine whether the cell voltage spread of the first or second sub-stack has fallen below the first threshold or is greater than the second threshold.

17. The method according to claim 14 further comprising continuing sending fresh hydrogen to the first or second sub-stack if the cell voltage spread of the first or second sub-stack is between the first and second threshold.

18. The method according to claim 14 further comprising causing a forced hydrogen flow shift and bleed switch to the first or second sub-stack if the cell voltage spread of the first or second sub-stack is greater than the second threshold for a time greater than a predetermined period of time.

19. The method according to claim 14 further comprising causing a system quick stop if the cell voltage spread becomes greater than a third ultimate minimum threshold for some period of time after fresh hydrogen is injected into the sub-stack and an anode bleed is performed from the other sub-stack.

20. The method according to claim 14 wherein the first threshold is about 15 mV and the second threshold is about 250 mV and the absolute minimum threshold for a quick stop is less than 0 mV.

* * * * *